(12) United States Patent
Wake

(10) Patent No.: US 8,200,927 B2
(45) Date of Patent: Jun. 12, 2012

(54) DATA BACKUP MANAGEMENT SYSTEM, COMPUTER SYSTEM, AND PROGRAM RECORDING MEDIUM

(75) Inventor: Hiroshi Wake, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 353 days.

(21) Appl. No.: 12/605,797

(22) Filed: Oct. 26, 2009

(65) Prior Publication Data

US 2011/0055501 A1    Mar. 3, 2011

(30) Foreign Application Priority Data

Aug. 25, 2009  (JP) ................................ 2009-194805

(51) Int. Cl.
*G06F 12/00* (2006.01)

(52) U.S. Cl. ........................................ 711/162; 711/170

(58) Field of Classification Search ........................ None
See application file for complete search history.

(56) References Cited

U.S. PATENT DOCUMENTS

| | | | |
|---|---|---|---|
| 6,789,178 B2 | 9/2004 | Mikkelsen et al. |
| 7,370,228 B2 | 5/2008 | Takahashi et al. |
| 2007/0150692 A1 | 6/2007 | Nagashima et al. |
| 2007/0220322 A1 | 9/2007 | Mikami |
| 2009/0222496 A1 | 9/2009 | Liu et al. |

FOREIGN PATENT DOCUMENTS

| | | |
|---|---|---|
| JP | 2004-264973 | 9/2004 |
| JP | 2006-072635 | 3/2006 |
| JP | 2007-249447 | 9/2007 |
| JP | 2008-547123 | 12/2008 |

*Primary Examiner* — Shawn X Gu
(74) *Attorney, Agent, or Firm* — Foley & Lardner LLP

(57) ABSTRACT

In a backup management system, data is copied remotely from a backup source volume to an intermediate volume. When access by a host ends and a backup time arrives, data is copied locally from the intermediate volume to a backup target volume. During a data restore, a user is able to select not only backup target volumes but also the intermediate volume as restore source candidates.

11 Claims, 14 Drawing Sheets

REMOTE COPY MANAGEMENT TABLE

| C10 | C11 | C12 | C13 | C14 |
|---|---|---|---|---|
| PVOL# | HOST ID | DATA WRITE START TIME | DATA WRITE END TIME | WRITE STATUS |
| PVOL #1 | HOST #I | 2009/07/07 12:15 | 2009/07/07 12:33 | Finish |
| | | 2009/07/07 16:00 | 2009/07/07 16:48 | Finish |
| | | ... | ... | ... |

| | | | | |
|---|---|---|---|---|
| LOCAL COPY MANAGEMENT TABLE | | | | |
| C20 | C21 | C22 | C23 | C24 |
| SVOL# | BACKUP START TIME | BACKUP END TIME | BACKUP STATUS | COPY PAIR NAME |
| SVOL#1 | 2009/07/07 09:00 | 2009/07/07 09:45 | Finish | Group1 |
| SVOL#2 | 2009/07/07 12:00 | 2009/07/07 12:30 | Finish | Group2 |
| SVOL#3 | 2009/07/07 15:00 | 2009/07/07 15:35 | Finish | Group3 |
| SVOL#4 | 2009/07/07 18:00 | — | Error | Group4 |
| SVOL#5 | 2009/07/07 21:00 | — | Ready | Group5 |

FIG. 9

RESTORE SOURCE LIST DISPLAY SCREEN

| SVOL# | BACKUP START TIME | BACKUP END TIME | BACKUP STATUS | COPY PAIR NAME |
|---|---|---|---|---|
| SVOL#1 | 2009/07/07 09:00 | 2009/07/07 09:45 | Finish | Group1 |
| SVOL#2 | 2009/07/07 12:00 | 2009/07/07 12:30 | Finish | Group2 |
| SVOL#3 | 2009/07/07 15:00 | 2009/07/07 15:35 | Finish | Group3 |
| SVOL#4 | 2009/07/07 18:00 | — | Error | Group4 |
| SVOL#5 | 2009/07/07 21:00 | — | Ready | Group5 |

☐ NOT LIMITED TO SVOL, USE VOLUME HOLDING MOST RECENT DATA

RESTORE SOURCE LIST DISPLAY SCREEN

| SVOL# | BACKUP START TIME | BACKUP END TIME | BACKUP STATUS | COPY PAIR NAME |
|---|---|---|---|---|
| SVOL#1 | 2009/07/07 09:00 | 2009/07/07 09:45 | Finish | Group1 |
| SVOL#2 | 2009/07/07 12:00 | 2009/07/07 12:30 | Finish | Group2 |
| SVOL#3 | 2009/07/07 15:00 | 2009/07/07 15:35 → 2009/07/07 16:48 | Finish | Group3 |
| SVOL#4 | 2009/07/07 18:00 | — | Error | Group4 |
| SVOL#5 | 2009/07/07 21:00 | — | Ready | Group5 |

NOT LIMITED TO SVOL, USE VOLUME HOLDING MOST RECENT DATA

FIG. 11

RESTORE SOURCE LIST DISPLAY SCREEN — G10 (3)

| SVOL# | BACKUP START TIME | BACKUP END TIME | BACKUP STATUS | COPY PAIR NAME |
|---|---|---|---|---|
| SVOL#1 | 2009/07/07 09:00 | 2009/07/07 09:45 | Finish | Group1 |
| SVOL#2 | 2009/07/07 12:00 | 2009/07/07 12:30 | Finish | Group2 |
| SVOL#3 | 2009/07/07 15:00 | 2009/07/07 15:35 | Finish | Group3 |
| SVOL#4 | 2009/07/07 18:00 | —<br>2009/07/07 16:48 | Error | Group4 |
| SVOL#5 | 2009/07/07 21:00 | — | Ready | Group5 |

C20   C21   C22   C23   C24

B1 ☑ NOT LIMITED TO SVOL, USE VOLUME HOLDING MOST RECENT DATA

RESTORE SOURCE LIST DISPLAY SCREEN

| SVOL# | BACKUP START TIME | BACKUP END TIME | BACKUP STATUS | COPY PAIR NAME |
|---|---|---|---|---|
| SVOL#1 | 2009/07/07 09:00 | 2009/07/07 09:45 | Finish | Group1 |
| SVOL#2 | 2009/07/07 12:00 | 2009/07/07 12:30 | Finish | Group2 |
| SVOL#3 | 2009/07/07 15:00 | 2009/07/07 15:35 2009/07/07 16:48 | Finish | Group3 |
| SVOL#4 | 2009/07/07 18:00 | — | Error | Group4 |
| SVOL#5 | 2009/07/07 21:00 | — | Ready | Group5 |

C10   C11   C12   C13   C14

☑ NOT LIMITED TO SVOL, USE VOLUME HOLDING MOST RECENT DATA

DATA BACKUP MANAGEMENT SYSTEM, COMPUTER SYSTEM, AND PROGRAM RECORDING MEDIUM

CROSS-REFERENCE TO RELATED APPLICATIONS

This application relates to and claims priority from Japanese Patent Application No. 2009-194805 filed on Aug. 25, 2009, the entire disclosure of which is incorporated herein by reference.

BACKGROUND OF THE INVENTION

1. Field of the Invention

The present invention relates to a data backup management system, a computer system, and a program recording medium.

2. Description of the Related Art

A local backup and a remote backup are known as methods of creating a data backup of a storage apparatus. A local backup is a method of creating a backup within the same storage apparatus. In a local backup, a backup source volume and a backup target volume exist within the same storage apparatus. In contrast, a remote backup is a method of creating a backup using a plurality of different storage apparatuses. In a remote backup, one storage apparatus includes the backup source volume, while another storage apparatus includes the backup target volume.

According to one conventional technology, a copy target storage apparatus is disposed in a separate location from a copy source storage apparatus, and backup target data is transferred and copied to a volume within the copy target storage apparatus. Furthermore, in the copy target storage apparatus, another volume is coupled to the volume storing the copy data, and the backup is created (JP-A-2007-249447, U.S. Pat. No. 6,789,178).

According to another conventional technology (JP-A-2004-264973), in cases where a storage apparatus is capable of executing both a local backup and a remote backup, a management screen to support copy control of the storage apparatus is prepared.

With the conventional technologies, when a fault of any kind arises in the backup source volume, the user selects one desired backup target volume from among a plurality of generational backup target volumes stored in the copy target storage apparatus, and issues a data restore instruction. However, the user is unable to utilize the volume in which the data from the backup source volume is first stored as a restore source volume. Data more recent than the data stored in the backup target volume is sometimes also stored in this volume, but the conventional technologies do not enable effective usage of the volume.

Moreover, with the conventional technologies, there are separate screens for managing remote backups and for managing local backups respectively, and therefore a user unfamiliar with remote backups is unable to manage backups easily, which is inconvenient.

SUMMARY OF THE INVENTION

Accordingly, an object of the present invention is to provide a data backup management system, a computer system, and a program recording medium that allow the most recent data of a storage apparatus to be used as a restore source. A further object of the present invention is to provide a data backup management system, a computer system, and a program recording medium with which a local copy and a remote copy can be managed via a common screen, and with which a backup source volume can be restored using the most recent data of the storage apparatus. Further objects of the present invention will become apparent from the description of the embodiments hereinbelow.

In order to achieve the above object, a data backup management system according to a first aspect of the present invention is a data backup management system, which is coupled to a backup source storage apparatus and a backup target storage apparatus, and manages a data backup from the backup source storage apparatus to the backup target storage apparatus, wherein the backup source storage apparatus includes a backup source volume accessed by a host computer, the backup target storage apparatus includes at least one or more backup target volumes, and an intermediate volume which is located between the backup source volume and the backup target volumes, and which serves as a backup target for the backup source volume and as a backup source for the backup target volumes, the data backup management system comprises: a communication interface circuit for coupling to the backup source storage apparatus and the backup target storage apparatus via a communication line; a memory for storing a predetermined computer program and a management table; and a microprocessor for executing the predetermined computer program by reading the program from the memory, and the microprocessor: controls a remote copy from the backup source volume to the intermediate volume, and a local copy from the intermediate volume to the backup target volume; creates, in a case where a fault relating to the remote copy or to the local copy is detected, a management screen displaying the backup target volume as a candidate for a restore source volume; and edits, in a predetermined case, part of information of the backup target volume, displayed on the management screen, on the basis of information relating to the intermediate volume.

A second aspect is the data backup management system according to the first aspect, wherein the microprocessor compares a remote copy end time relating to the intermediate volume and a local copy end time relating to the backup target volume and, in a case where the remote copy end time is more recent than the local copy end time, rewrites the local copy end time of the backup target volume displayed on the management screen with the remote copy end time, and displays this remote copy end time.

A third aspect is the data backup management system according to the first aspect, wherein, in a case where the local copy fails, the microprocessor displays a remote copy end time relating to the intermediate volume on the management screen as a local copy end time relating to the backup target volume.

A fourth aspect is the data backup management system according to the first aspect, wherein in a case where a plurality of the backup target volume are displayed on the management screen, the microprocessor: (1) in a case where a fault occurs in the backup source volume, compares a remote copy end time, relating to the intermediate volume, with a latest local copy end time among local copy end times relating to each of the backup target volumes, and in a case where the remote copy end time is more recent than the latest local copy end time, rewrites the latest local copy end time, displayed on the management screen, with the remote copy end time, and displays this remote copy end time, and (2) in a case where the local copy fails, displays the remote copy end time on the management screen as the local copy end time of the backup target volume for which the local copy has failed.

A fifth aspect is the data backup management system according to the fourth aspect, wherein the management screen includes, for each of the backup target volumes, a local copy start time, a local copy end time, and information indicating a state of the local copy.

A sixth aspect is the data backup management system according to the fifth aspect, wherein the management screen includes an indication device for indicating whether a search range for the restore source volume is to be a first range or a second range, and the microprocessor, when the first range is indicated, displays on the management screen only each of the local copy end times of each of the backup target volumes, and when the second range is indicated, (1) in a case where a fault occurs in the backup source volume, and the remote copy end time is more recent than the latest local copy end time, and (2) in a case where the local copy fails, the microprocessor displays the remote copy end time on the management screen as the latest local copy end time or the local copy end time.

According to a seventh aspect, a remote copy management table for managing the remote copy and a local copy management table for managing the local copy are stored in the memory, the remote copy management table includes a remote copy start time, a remote copy end time, and a state of the remote copy, and the local copy management table includes identification information identifying each of the backup target volumes, the local copy start time, the local copy end time, and the state of the local copy, and the microprocessor, when the first range is indicated, displays each of the local copy end times on the management screen by using the local copy management table, and when the second range is indicated, the microprocessor displays the remote copy end time on the management screen as the latest local copy end time or the local copy end time, by using the remote copy management table and the local copy management table.

An eighth aspect is the data backup management system according to the first aspect, wherein the microprocessor compares a remote copy end time relating to the intermediate volume with a local copy end time relating to the backup target volume and, when the remote copy end time is more recent than the local copy end time, the microprocessor displays the remote copy end time together with the local copy end time of the backup target volume displayed on the management screen.

A computer system according to a ninth aspect is a computer system including a host computer, a backup source storage apparatus used by the host computer, a backup target storage apparatus coupled to the backup source storage apparatus, and a management apparatus for managing a data backup from the backup source storage apparatus to the backup target storage apparatus, wherein the backup source storage apparatus includes a backup source volume to be accessed by a host computer, the backup target storage apparatus includes at least one or more backup target volumes, and an intermediate volume which is located between the backup source volume and the backup target volumes and serves as a backup target for the backup source volume and as a backup source for the backup target volumes, and the management apparatus: controls a remote copy from the backup source volume to the intermediate volume, and a local copy from the intermediate volume to the backup target volume, and creates in a case where a fault relating to the remote copy or to the local copy is detected, a management screen displaying the backup target volume as a candidate for a restore source volume, and edits in a predetermined case, part of information on the backup target volume, displayed on the management screen, on the basis of information relating to the intermediate volume.

A tenth aspect is the computer system according to the ninth aspect, wherein, in a case where a plurality of the backup target volumes are displayed on the management screen, the management apparatus: (1) in a case where a fault occurs in the backup source volume, compares a remote copy end time, relating to the intermediate volume, with a latest local copy end time among local copy end times relating to each of the backup target volumes, and in a case where the remote copy end time is more recent than the latest local copy end time, rewrites the latest local copy end time, displayed on the management screen, with the remote copy end time, and displays this remote copy end time, and (2) in a case where the local copy fails, displays the remote copy end time on the management screen as the local copy end time of the backup target volume for which the local copy has failed.

At least some of the components of the present invention can be configured as computer programs. The computer programs may be distributed after being secured on a recording medium, or sent via a communication network.

BRIEF DESCRIPTION OF THE DRAWINGS

FIG. 3 shows a remote copy management table;

FIG. 4 shows a local copy management table;

FIG. 9 shows an example of a management screen;

FIG. 11 shows yet another example of a management screen;

FIG. 13 shows an example of a management screen according to a second embodiment.

DESCRIPTION OF THE PREFERRED EMBODIMENTS

Embodiments of the present invention will be described hereinbelow with reference to the drawings. According to the present embodiment, as will be described subsequently, in a system that creates backups using both remote copy and local copy, stored content of a backup source volume can be restored using the most recent data of a backup target storage apparatus 20(2). Furthermore, according to the present embodiment, remote-copy backups can be managed using a screen for managing local copies.

Embodiment 1

Figure 1:
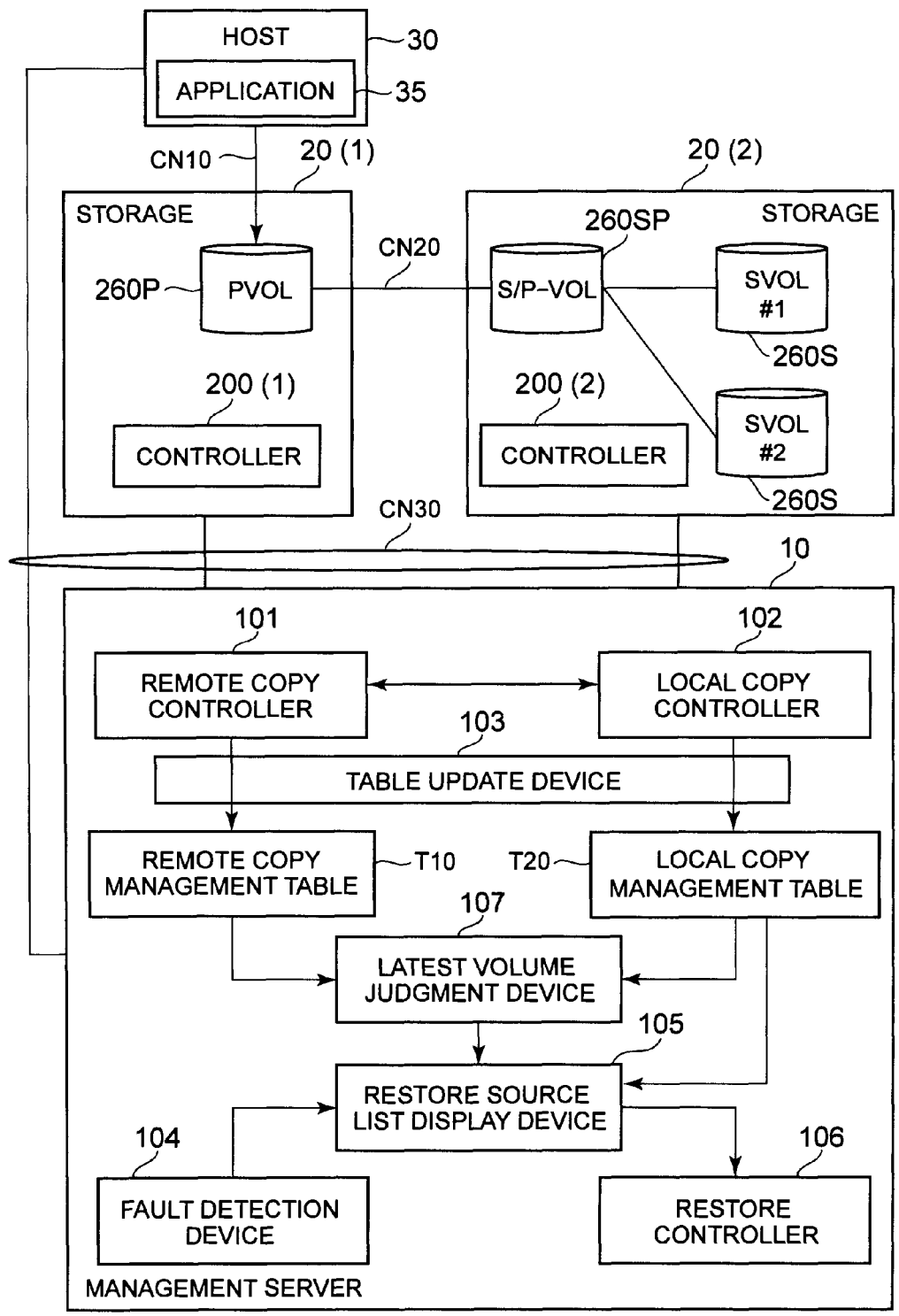
FIG. 1 is an illustrative view providing an overview of the functions of a system according to this embodiment.

FIG. 1 provides an overview of the computer system according to this embodiment. The hardware configuration of the computer system will be described subsequently using FIG. 2. The computer system comprises a management server 10, a backup source storage apparatus 20(1), a backup target storage apparatus 20(2), and a host computer (hereinafter 'host') 30, for example.

Connections between the computers will be described first. The host 30 and the backup source storage apparatus 20(1) are coupled to each other via a first communication route CN10. The backup source storage apparatus 20(1) and the backup target storage apparatus 20(2) are coupled to each other via a second communication route CN20. The management server 10, the storage apparatuses 20(1) and 20(2), and the host 30 are coupled to one another via a third communication route CN30.

The communication routes CN10 and CN20 can each be configured as an FC_SAN (Fibre Channel_Storage Area Network) or an IP_SAN (Internet protocol_SAN), for example. The third communication route CN30, which is a management communication route, can be configured as a LAN (Local Area Network) or the Internet, for example. Note that although a case where the communication routes CN10, CN20, and CN30 are distinct from one another is shown in FIG. 1, a single communication route may instead be used.

The management server 10, which serves as a 'data backup management system' or 'management apparatus', comprises a remote copy controller 101, a local copy controller 102, a table update device 103, a fault detection device 104, a restore source list display device 105, a restore controller 106, a latest volume judgment device 107, a remote copy management table T10, and a local copy management table T20, for example.

The remote copy controller 101 controls copying of data from a backup source volume 260P in the backup source storage apparatus 20(1) to an intermediate volume 260SP in the backup target storage apparatus 20(2).

The local copy controller 102 controls copying of data from the intermediate volume 260SP to backup target volumes 260S in the backup target storage apparatus 20(2). In the present embodiment, the backup target volumes 260S are created in pre-designated periods, as will be described hereinafter.

The table update device 103 updates the remote copy management table T10 and the local copy management table T20 on the basis of information from each of the storage apparatuses 20(1), 20(2).

The fault detection device 104 detects remote copy-related faults and local copy-related faults on the basis of information from each of the storage apparatuses 20(1) and 20(2). Remote copy-related faults include faults generated in the backup source volume 260P or in the backup source storage apparatus 20(1). Local copy-related faults include faults generated in the backup target volumes 260S. The fault detection device 104 is also able to detect faults generated in the backup source volume 260P or the backup source storage apparatus 20(1), as well as faults generated in the backup target volumes 260S, also using information from the host 30.

The restore source list display device 105 creates a restore source list display screen G10 (see FIGS. 9 to 11), serving as the 'management screen', and displays the screen G10 for the user. Details on the restore source list display screen G10 and the method used to display this screen for the user will be provided subsequently.

The restore controller 106 uses a restore source volume, selected by the user via the restore source list display screen G10, to restore the data of the backup source volume 260P to data of a restorable time point.

The latest volume judgment device 107 judges whether most recent data, available as backup data in the backup source volume 260P, exists in either the intermediate volume 260SP or the backup target volumes 260S.

The backup source storage apparatus 20(1) is installed in a local site. The backup target storage apparatus 20(2) is installed in a remote site physically separate from the local site.

The backup source storage apparatus 20(1) comprises a controller 200(1), and the backup source volume 260P. The backup source volume 260P is accessed by an application program 35 (referred to hereinbelow as 'application 35') of the host 30. The controller 200(1) writes data to the backup source volume 260P or reads data from the backup source volume 260P, on the basis of an I/O (Input/Output) request issued by the application 35.

In addition, the controller 200(1) controls remote copy in accordance with instructions from the management server 10. Furthermore, the controller 200(1) collects various states of the storage apparatus 20(1) and sends the states to the management server 10. Examples of such various states include the frequency and volume of I/O requests, CPU load, memory usage, and the existence of faults.

The backup target storage apparatus 20(2) comprises a controller 200(2), the intermediate volume 260SP, and a plurality of the backup target volume 260S. The intermediate volume 260SP is located between the backup source volume 260P, and the backup target volumes 260S, and fulfills remote copy- and local copy-related functions.

A remote copy pair is formed by a backup source volume 260P, which serves as the copy source volume, and an intermediate volume 260SP, which serves as the copy target volume. Data written to the backup source volume 260P is transferred to the intermediate volume 260SP via the second communication route CN20, and written to the intermediate volume 260SP. Remote copy methods include synchronous remote copy and asynchronous remote copy. With synchronous remote copy, when data is written to the backup source volume 260P, this data is immediately transferred and written to the intermediate volume 260SP. With asynchronous remote copy, data is written to the backup source volume 260P, and then transferred and written with timing to the intermediate volume 260SP. Either method may be adopted. In the present embodiment, a synchronous remote copy case will be described by way of example.

A local copy pair is formed by the intermediate volume 260SP, which serves as the copy source volume, and the backup target volume 260S, which serves as the copy target volume. When a predetermined backup time is reached, data stored in the intermediate volume 260SP is transferred and written to the backup target volume 260S. After copying is complete, the backup target volume 260S is stored separately from the intermediate volume 260SP. When time has elapsed and another backup time is reached, the intermediate volume 260SP is coupled to another backup target volume 260S, and a copy is made from the intermediate volume 260SP to the other backup target volume 260S.

The controller 200(2) controls the aforementioned remote copy- and local copy-related processing. The controller 200(2) also collects various states in the backup target storage apparatus 20(2) and sends these states to the management server 10.

The host 30 is configured as a computer such as a so-called open-systems server computer or a mainframe machine, for example. Client terminals (not shown) are coupled to the host 30, each client terminal using services provided by the application 35. Examples of the application 35 include a customer management program, a sales management program, a video distribution program, a document creation program, an image creation program, and an electronic mail management program.

Figure 2:
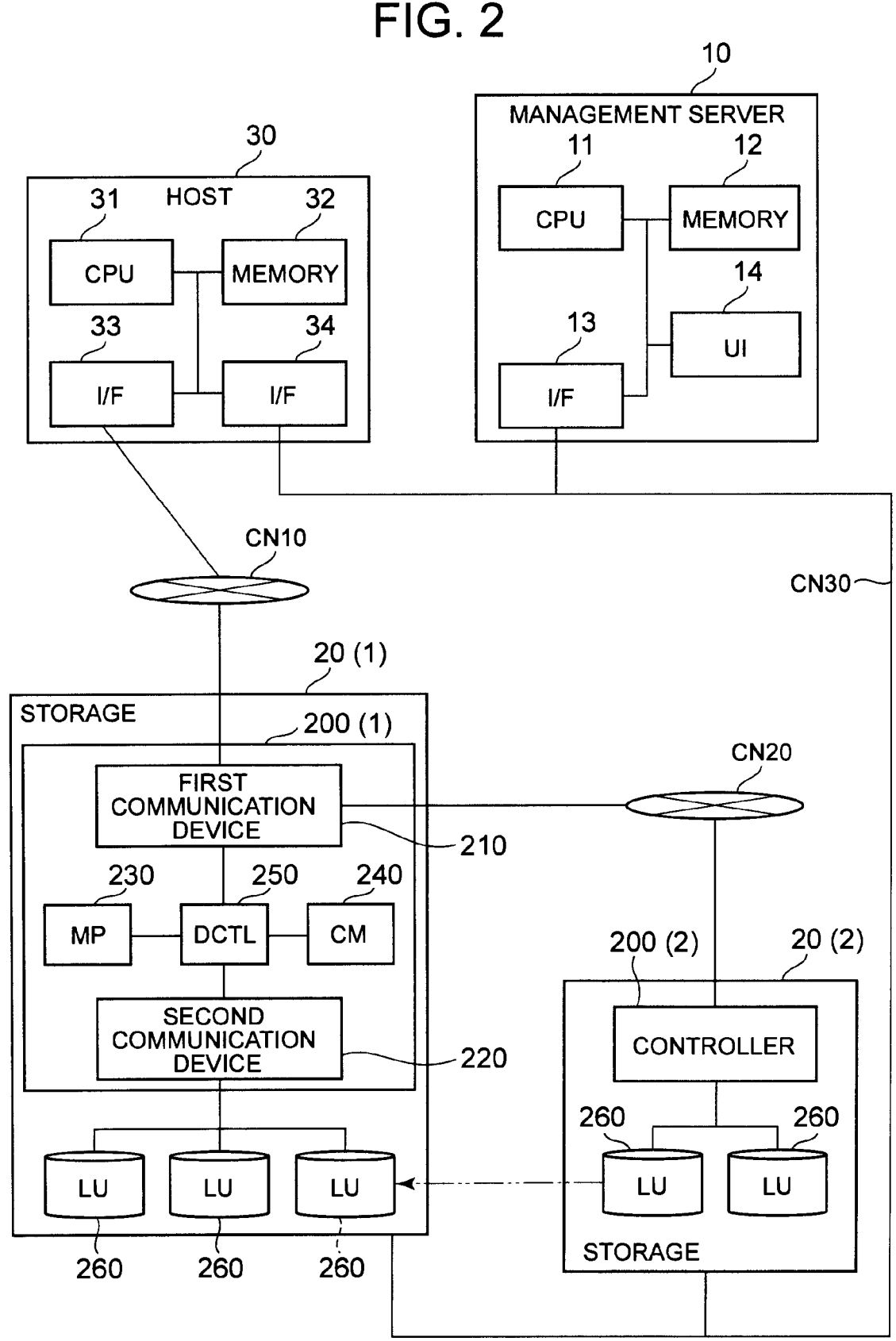
FIG. 2 shows the configuration of the system.

The hardware configuration will now be described with reference to FIG. 2. The management server 10 comprises a microprocessor 11, a memory 12, a communication interface 13, and a user interface 14, for example. Note that in FIG. 2, microprocessor is abbreviated as 'CPU' (Central Processing Unit), and interface is abbreviated as 'I/F'.

The memory 12 is a storage device such as a RAM (Random Access Memory), a ROM (Read Only Memory), a flash memory device, or a hard disk drive, for example. The memory 12 stores an operating system, various programs for implementing various functions 101 to 107 shown in FIG. 1, and management tables T10 and T20, for example. Functions 101 to 107 are each implemented as a result of the microprocessor 11 reading and executing the programs stored in the memory 12.

The communication interface 13 is a circuit for communicating with the storage apparatuses 20(1) and 20(2) and the host 30 via the management communication route CN30. The microprocessor 11 collects information via the communication interface 13 and the communication route CN30, and sends predetermined instructions to the respective storage apparatuses 20(1) and 20(2).

The user interface 14 comprises a device for outputting information from the management server 10, and a device for inputting information to the management server 10. Examples of information output devices include a display device or a speech output device. Examples of information input devices include a keyboard switch, a pointing device, or a microphone.

Note that the management server 10 and the user interface 14 may be configured separate from each other. A management terminal for operating the management server 10 may be provided separately and the user interface may be provided in the management terminal, for example. The management system may comprise one management server 10, or one management server 10 and one or a plurality of management terminals. The management system may also be configured such that functions implemented by the management server 10 are shared and processed by a plurality of servers.

The host 30 comprises a microprocessor 31, a memory 32, and communication interfaces 33 and 34. The memory 32 stores an operating system and the programs of the application 35, for example. The microprocessor 31 reads and executes programs of the application 35 stored in the memory 35.

The first communication interface 33 is a circuit for communicating with the backup source storage apparatus 20(1). The other communication interface 34 is a circuit for communicating with the management server 10.

The backup source storage apparatus 20(1) includes the controller 200(1) and one or a plurality of logical volumes 260. One or a plurality of the logical volumes 260 are used as the backup source volume 260P.

The logical volumes 260 are generated on the basis of one or a plurality of storage devices. Examples of such storage devices include various storage devices capable of reading and writing data such as hard disk drives, semiconductor memory, optical disk drives, magneto-optical disk drives, or magnetic tape drives.

When hard disk devices are used, FC (Fibre Channel) disks, SCSI (Small Computer System Interface) disks, SATA disks, ATA (AT Attachment) disks, or SAS (Serial Attached SCSI) disks, and so on, may be used. Other storage devices may also be used, such as flash memory, FeRAM (Ferroelectric Random Access Memory), MRAM (Magnetoresistive-Random Access Memory), Ovonic Unified memory (OUM), RRAM (Resistance RAM), or PRAM (Phase change RAM), for example. In addition, the hardware configuration may also involve combining a variety of different storage devices, such as flash memory devices and hard disk drives, for example, within the HDU 22.

Physical storage areas including one or a plurality of storage devices may be grouped together and one or a plurality of logical storage areas may be provided in the grouped storage areas. These logical storage areas are called logical volumes 260.

The controller 200(1) includes a first communication device 210, a second communication device 220, a microprocessor 230 (MP in the drawings), a cache memory 240 (CM in the drawings), and a data transfer circuit 250 (DCTL in the drawings), for example. Note that the controller 200(1) exchanges information with the management server 10 via a service processor (abbreviated as 'SVP') (not shown).

The first communication device 210 is a communication control circuit for communicating with the host 30 and the backup target storage apparatus 20(2). The second communication device 220 is a communication control circuit for communicating with each of the storage devices that the logical volumes 260 comprise.

The microprocessor 230 reads and executes programs stored in the cache memory 240 and in predetermined logical volumes 260. The cache memory 240 stores received data and programs, and so on. The data transfer circuit 250 couples the cache memory 240 to each of the communication devices 210 and 220, and controls data transfers.

The composition of information used in the present embodiment will now be described based on FIGS. 3 and 4. In the present embodiment, various information of the embodiment will sometimes be described using expressions such as ' table', ' database', ' list', or ' queue', for example. The various information used in the present embodiment need not necessarily be a data structure such as a table, a database, a list, or a queue, and may instead be another structure. In other words, the various information used in this embodiment is not dependent on a specific data structure. Note that when various information used in the present embodiment is described, a variety of expressions such as 'identification information', 'identifier', 'ID', and 'name' and so on, for example, may be used, but that these varied expressions are interchangeable.

FIG. 3 shows a table T10 for managing a remote copy to the intermediate volume 260SP. The remote copy management table T10 is stored in the memory 12 of the management server 10. The remote copy management table T10 comprises a primary volume number C10, a host identifier C11, a data write start time C12, a data write end time C13, and a write status C14, for example. 'Identifier' is abbreviated as 'ID' in the drawings.

The primary volume C10 is information identifying the backup source volume 260P serving as the copy source. The host identifier C11 is information identifying the host 30 that uses the backup source volume 260P. More precisely, the host identifier C11 is information identifying the application 35 using the backup source volume 260P.

The data write start time C12 corresponds to a 'time when remote copy is started' and signifies the time when writing of data from the backup source volume 260P to the intermediate volume 260SP is started. The data write end time C13 corresponds to a 'time when the remote copy ends', and signifies the time when writing of data from the backup source volume 260P to the intermediate volume 260SP ends.

The write status C14 is information indicating the state of data writing to the intermediate volume 260SP. The write status while data is being written to the intermediate volume 260SP is 'copying'. The write status when data writing to the intermediate volume 260SP ends is 'finish'.

FIG. 4 shows a table T20 for managing local copies. The local copy management table T20 is stored in the memory 12 of the management server 10 in the same way as the remote copy management table T10.

The local copy management table T20 comprises a secondary volume number C20, a backup start time C21, a backup end time C22, a backup status C23, and a copy pair name C24, for example.

The secondary volume number C20 is information identifying the backup target volume 260S serving as the copy target of the local copy. The backup start time C21 signifies a time when a local copy is started. The backup end time C22 signifies a time when the local copy ends.

Whenever a predetermined time has elapsed, backup data is created at a predetermined time point by locally copying stored content of the intermediate volume 260SP to the backup target volume 260S. Hence, in the present embodiment, the start of a local copy is sometimes referred to as the start of a backup, and the end of a local copy is sometimes referred to as the end of a backup.

The backup status C23 indicates the state of a local copy. While data is being written from the intermediate volume 260SP to the backup target volume 260S, the backup status C23 is 'copying'. When data writing to the backup target volume 260S ends, the backup status C23 changes to 'finish'. In cases where a fault occurs during a local copy, the backup status C23 changes to 'error'. The copy pair name C24 is information identifying each local copy pair.

The operation of the present embodiment will now be described based on FIGS. 5 to 12. The following description will mainly focus on the management server. The description may also focus on the functions 101 to 107 implemented by the management server 10.

Each of the flowcharts that follow provides an overview of the processes at the level required to understand and carry out the present invention, and may differ from the actual computer programs. A so-called person skilled in the art may clearly change the illustrated steps to other steps or add new steps. Note that not all of the processes described hereinbelow need to be implemented by a computer program. At least some of the computer programs may also be implemented as hardware circuits.

Figure 5:
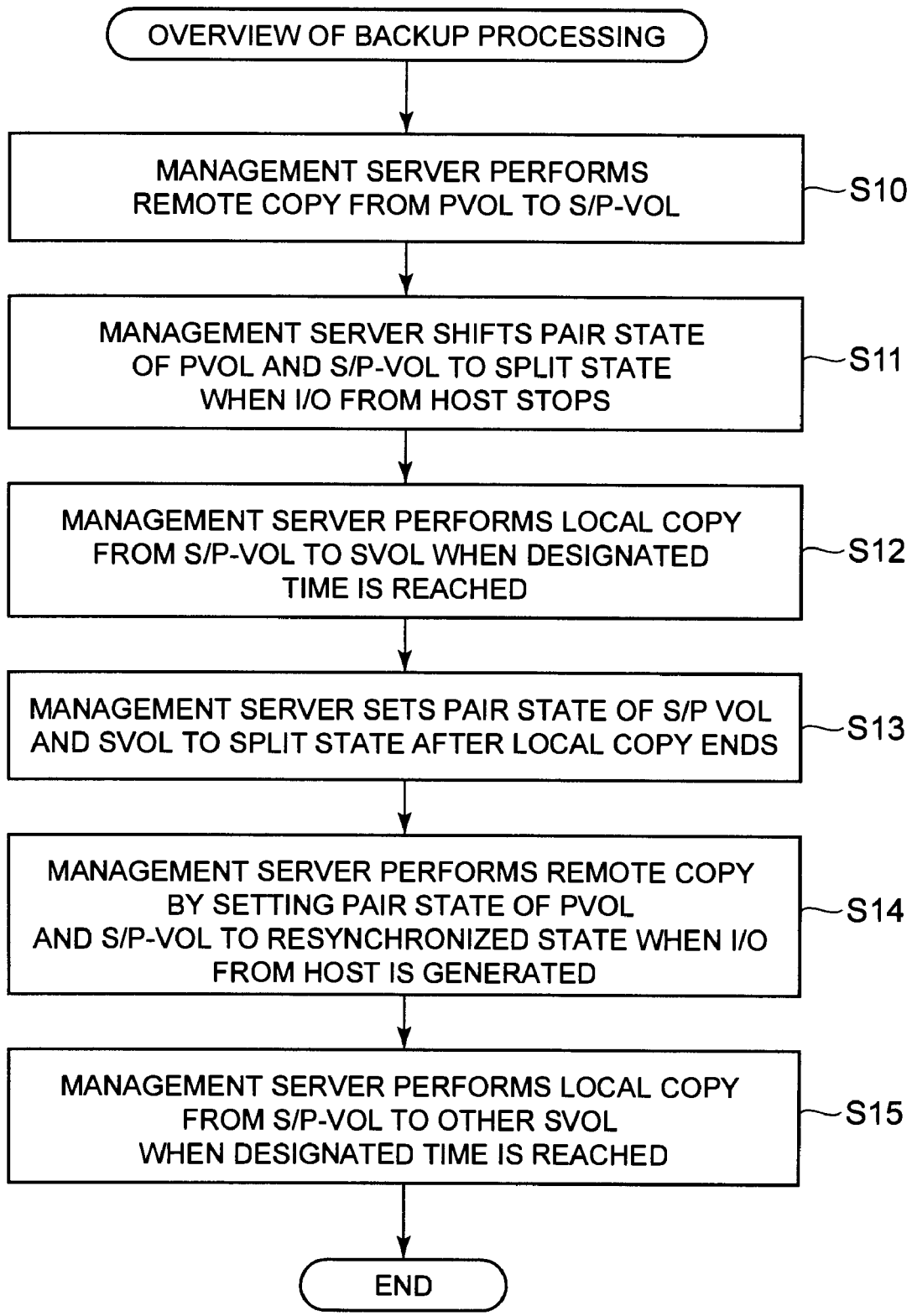
FIG. 5 is a flowchart providing an overview of backup processing.

FIG. 5 provides an overview of backup processing performed by the management system of the present embodiment. The management server 10 forms a remote copy pair using a backup source volume 260P and an intermediate volume 260SP by issuing a predetermined instruction to each of the storage apparatuses 20(1) and 20(2), and sets the pair state as 'copying'. Consequently, a remote copy starts, and data written to the backup source volume 260P is immediately transferred to and stored in the intermediate volume 260SP (S10).

The management server 10 monitors the I/O issued by the host 30 (strictly speaking, the application 35, but the host 30 is referred to here for convenience) using the backup source volume 260P. The management server 10 sets the remote copy pair to a split state upon detecting that writing of data from the host 30 to the backup source volume 260P has ended (S11). The remote copy is accordingly stopped.

Thereafter, the management server 10 stands by until a backup time designated beforehand by the user is reached. When the designated backup time is reached, the management server 10 forms a local copy pair using the intermediate volume 260SP and an unused backup target volume 260S, and writes all the data stored in the intermediate volume 260SP to the backup target volume 260S (S12). When the copy is complete, the management server 10 changes the pair state of the intermediate volume 260SP and the backup target volume 260S to the split state (S13).

The management server 10 also monitors access by the host 30 to the backup source volume 260P while a local copy is being executed (while a backup is being created). When the host 30 resumes data writing to the backup source volume 260P, the management server 10 starts a remote copy after placing the backup source volume 260P and the intermediate volume 260SP in a resynchronized state (S14).

When time has elapsed and the next backup time is reached, the management server 10 forms a local copy pair from a new backup target volume 260S and the intermediate volume 260SP, and starts a local copy (S15).

Figure 6:
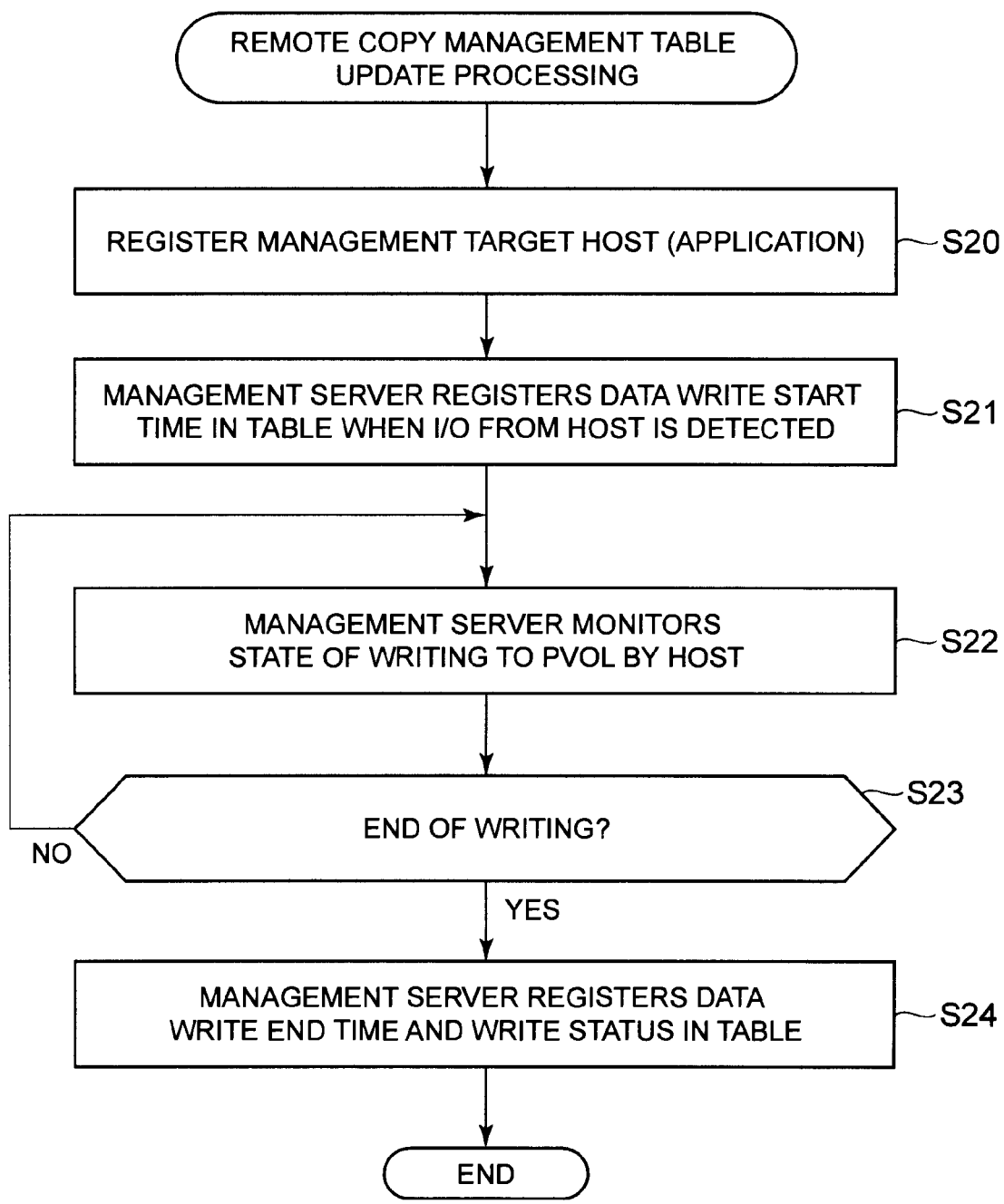
FIG. 6 a flowchart showing processing to update the remote copy management table.

FIG. 6 is a flowchart showing processing to update the remote copy management table T10. The management server 10 registers information C10 identifying the management target host 30 (more precisely the application 35), and a number C11 of the backup source volume in the remote copy management table T10 (C20).

Upon detection of data writing by the host 30 to the backup source volume 260P, the management server 10 records the writing start time C12 in the remote copy management table T10 (S21).

In the present embodiment, a case of synchronous remote copy is described. Hence, when data is written by the host 30 to the backup source volume 260P, the data is immediately transferred to and stored in the intermediate volume 260SP. Therefore, the time when data is written to the backup source volume 260P may be considered to be the time when data is written to the intermediate volume 260SP without problems.

The management server 10 monitors the state of writing by the host 30 to the backup source volume 260P (S22). The management server 10 judges whether writing by the host 30 to the backup source volume 260P has ended (S23). When writing has ended (S23: YES), the management server 10 records the data write end time C13 and the write status C14 in the remote copy management table T10 (S24). The value of the write status C13 is set as 'finish'.

Figure 7:
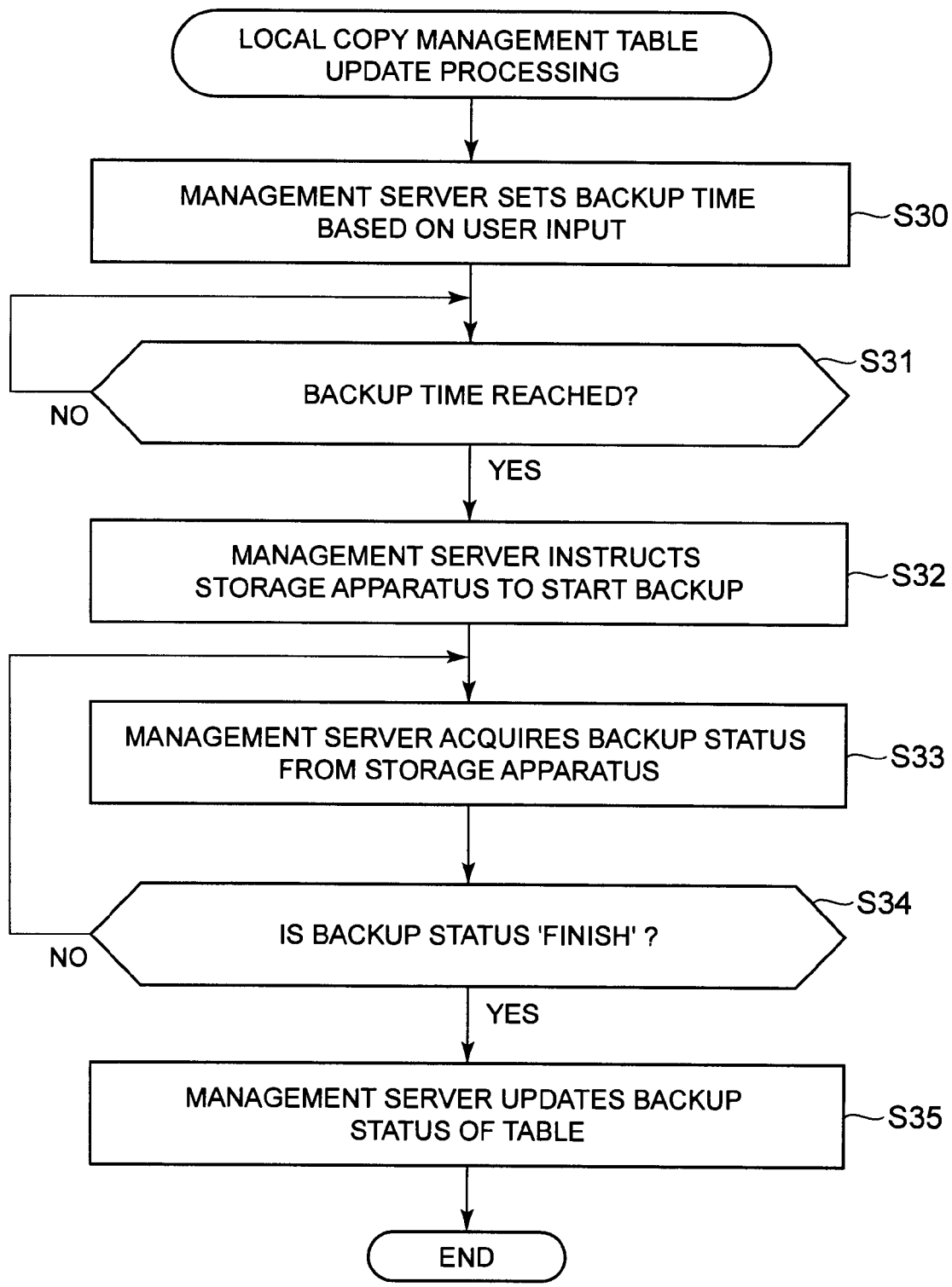
FIG. 7 is a flowchart showing processing to update the local copy management table.

FIG. 7 is a flowchart showing processing to update the local copy management table T20. The management server 10 stores the backup time designated by the user in the memory 12 (S30). The backup time can be set as a predetermined cycle such as every three hours, every six hours, every twelve hours, every twenty-four hours, or every week, for example. In the present embodiment, a case where a backup is created every three hours is described by way of example. Note that a specific date and time may be designated as the backup time, such as '13:10:00 on Jul. 7, 2009', for example.

The management server 10 judges whether the backup time designated by the user has been reached based on an output value from a built-in timer, or time information received from outside (S31). When the backup time is reached (S31: YES), the management server 10 instructs the backup target storage apparatus 20(2) to start the backup (S32). In so doing, the management server 10 records the start time C21 of the backup in the local copy management table T20.

After receiving the instruction from the management server 10, the backup target storage apparatus 20(2) transfers all the data stored in the intermediate volume 260SP to the backup target volume 260S for storage in the latter.

The management server 10 acquires the backup status from the backup target storage apparatus 20(2) (S33), and judges whether the backup status value is 'finish' (S34). When the backup (local copy) is complete, the backup target storage apparatus 20(2) notifies the management server 10 that the backup status is 'finish'. Upon confirming that the backup status is 'finish' (S34: YES), the management server 10 sets the backup status C23 of the local copy management table T20 to 'finish' (S35). In addition, the management server 10 records the backup end time C23 in the local copy management table T20.

Figure 8:
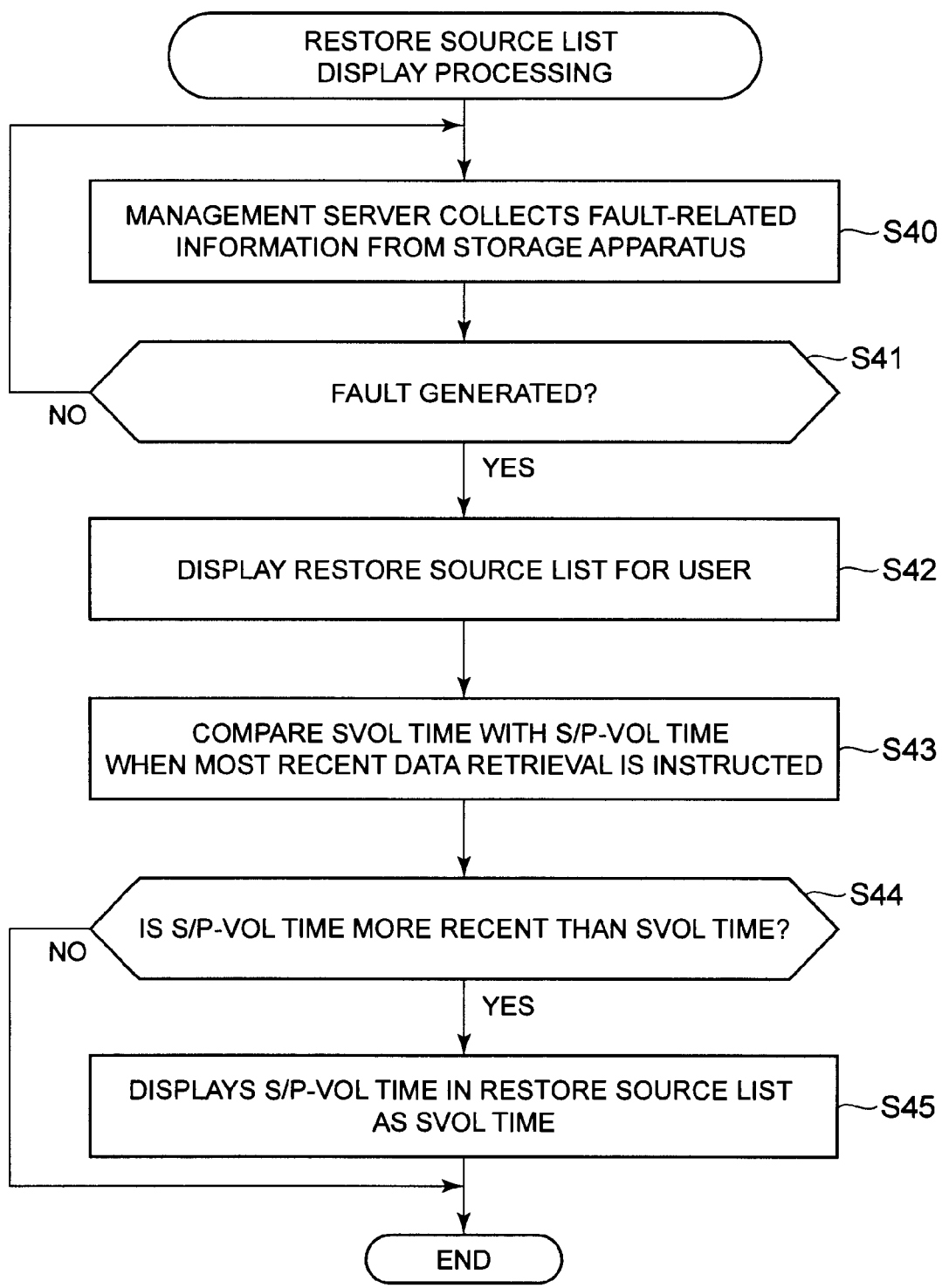
FIG. 8 is a flowchart showing processing to display a restore source list.

FIG. 8 is a flowchart showing processing to display the restore source list. This processing is executed in response to a user instruction in cases where a fault is generated in the backup source volume 260P and this volume 260P cannot be accessed, or in a case where the backup source storage apparatus 20(1) stops due to a fault, or where the content of the backup source volume 260P is deleted or changed due to an erroneous operation by the user, for example.

The management server 10 collects fault-related information from each of the storage apparatuses 20(1) and 20(2) (S40), and judges whether a fault relating to the backup source volume 260P is generated (S41). Faults relating to the backup target volumes 260S are not handled by this processing. Faults relating to the backup source volume 260P include, for example, a fault with the backup source volume 260P, a fault with the backup source storage apparatus 20(1), or deletion of content or changes to content of the backup source volume 260P by the user, for example.

When a fault relating to the backup source volume 260P is detected (S41: YES), the management server 10 creates a restore source list and displays this list for the user (S42). The screen transitions of screen G10 displayed for the user will be described subsequently using FIGS. 9 to 11.

When the user selects a check box B1 in order to instruct retrieval of the most recent data, the management server 10 compares the write end time C13 of the intermediate volume 260SP and the backup end time C22 of the backup target volume 260S (S43).

In cases where the write end time C13 of the intermediate volume is more recent than the backup end time C22 of the backup target volume 260S (S44: YES), the management server 10 displays the write end time C13 of the intermediate volume 260SP in the restore source list as the backup end time of the backup target volume 260S (S45).

Figure 10:
FIG. 10 shows another example of a management screen.

FIGS. 9 to 11 show the screen G10 displaying the restore source list. The numbers (1), (2), and (3) are added after G10 to reflect changes in the screen G10. FIG. 9 shows screen G10(1), which is displayed for the user first. FIGS. 9 and 10 illustrate a case where a remote copy-related fault is generated and, more precisely, a case where a fault is generated in the backup source volume 260P that the remote copy pair comprises.

In the description of FIGS. 9 and 10, it is assumed, for the sake of convenience, that a remote copy to the intermediate volume 260SP ends at 16:48 (see FIG. 3) and that a fault is generated in the backup source volume 260P at 17:30. The latest backup target volume 260S created before the fault occurred is identified by the secondary volume number 'SVOL#3'. The backup end time relating to the backup target volume 260S is 15:35.

The restore source list display screen G10 displays each of the items C20 to C24 recorded in the local copy management table T20, as shown in FIG. 9. In addition, the screen G10 includes the check box B1. The check box B1 is an indication device for indicating to the management server 10 that the most recent data available is to be retrieved.

In other words, check box B1 is a designation device for indicating that not only the backup target volumes 260S may be used as restore source volumes but also that the intermediate volume 260SP is to be added to the candidates for the restore source volume.

When a check mark is not placed in the check box B1, only the backup target volumes 260S are used as candidates for the restore source volume. The user is able to select a backup target volume 260S (SVOL#3) which has the most recent backup end time, and restore the backup source volume 260P by using backup data for a backup which ended at 15:35.

FIG. 10 shows a restore source list display screen G10(2) in cases where the check box B1 has a check mark. When the check box B1 has a check mark, the management server 10 compares the write end time of the intermediate volume 260SP with the latest backup end time as illustrated by the processing in FIG. 8.

Here, the write end time of the intermediate volume 260SP is 16:48, but the most recent backup end time is 15:35. Hence, the data stored in the intermediate volume 260SP is more recent. The management server 10 therefore rewrites the backup end time of the most recent backup target volume 260S (SVOL#3), i.e. 15:35, as 16:48, and displays the restore source list.

FIG. 11 illustrates a case where a fault is generated in a local copy, and more precisely where a fault is generated in the backup target volume 260S that the local copy pair comprises, and the data of the backup source volume 260P then needs to be restored.

Suppose that a local copy from the intermediate volume 260SP to the backup target volume 260S (SVOL#4) is started at 18:00, but that the local copy is suspended due to a fault generated in the backup target volume 260S (SVOL#4). When drive failure occurs in the storage device that the backup target volume 260S comprises, for example, a fault is also generated in the backup target volume 260S. Thereafter, in cases where the backup source volume 260P is restored, the screen G10 is displayed for the user.

In cases where a user selects the check box B1, the management server 10 displays 16:48, the remote copy end time, as the backup end time of the backup target volume 260S (SVOL#4) relating to the failed local copy. In cases where the user does not select the check box B1, the backup end time (15:35) of the backup target volume 260S (SVOL#3) relating to the last successful local copy is the most recent backup end time.

The management server 10 thus changes the end time of the latest backup to the write end time (remote copy end time, or split time) of the intermediate volume 260SP according to the user's wishes.

Figure 12:
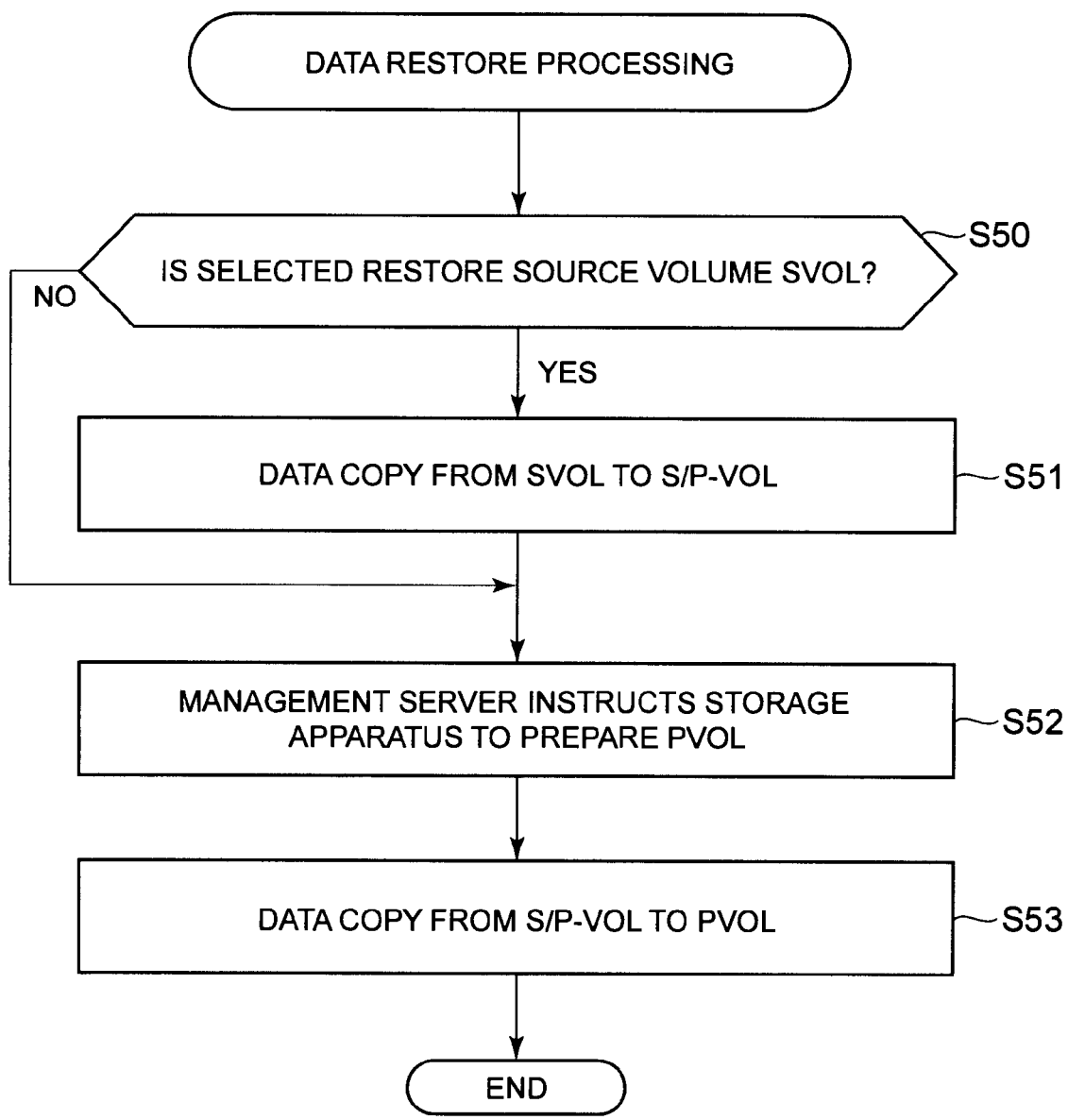
FIG. 12 is a flowchart for processing to restore data.

FIG. 12 is a flowchart showing processing to restore the stored content of the backup source volume 260P. The management server 10 judges whether the designated restore source volume is a backup target volume 260S on the basis of the restorable time (backup end time) designated by the user (S50).

In cases where the backup target volume 260S is selected (S50: YES), the management server 10 generates a local copy pair using a backup target volume 260S and the intermediate volume 260SP, and copies data from the backup target volume 260S to the intermediate volume 260SP (S51). In cases where the intermediate volume 260SP is selected as the restore source volume (S50: NO), the processing skips step S51 and advances to step S52.

The management server 10 issues an instruction to the backup source storage apparatus 20(1) to prepare the backup source volume 260P (S52). The management server 10 generates a remote copy pair using the prepared backup source volume 260P and the intermediate volume 260SP, and copies data from the intermediate volume 260SP to the backup source volume 260P (S53). The stored content of the backup source volume 260P is accordingly restored to the stored content at the time point selected by the user.

In the present embodiment having such a configuration, the management server 10 creates a restore source list display screen G10 when a fault is detected, and in a predetermined case, changes the backup end time displayed on the screen G10 to the end time for writing data to the intermediate volume 260SP. Hence, the user is able to use the intermediate volume 260SP as the restore source volume, which improves user convenience.

According to the present embodiment, when a fault is generated in the backup source volume 260P, in cases where the remote copy end time is more recent than the most recent local copy end time, the management server 10 rewrites the latest local copy end time displayed on the screen G10 with the remote copy end time, and displays the latter on the screen G10. In addition, in cases where a local copy fails, the management server 10 displays the remote copy end time on the screen G10 as the local copy end time of the backup target volume 260S in which the local copy failed. The user is thus able to use the most recent data according to the type of fault, whereby user convenience improves.

In the present embodiment, the check box B1 is provided on the restore source list display screen G10. When the check box B1 is selected, the intermediate volume 260SP is made available, and when the check box B1 is not selected, only the backup target volumes 260S are made available. In other words, the restore source list display screen G10 is basically configurable as a screen for managing local copies, in which display content can be changed depending on whether the check box B1 is selected. Even a user unfamiliar with remote copy is therefore able to indicate a data restore easily using the restore source list display screen G10, which resembles a local copy management screen with which the user is familiar.

Embodiment 2

A second embodiment will now be described based on FIG. 13. This embodiment corresponds to a modification of the first embodiment, and therefore the focus of the description will be on differences from the first embodiment.

FIG. 13 shows a restore source list display screen G10 of the present embodiment. In the present embodiment, when the check box B1 is selected, the backup end times and the remote copy end times (end times of data writing to intermediate volumes 260SP) are displayed simultaneously so that the user can choose either end time.

The present embodiment having the above configuration exhibits the same effects as the first embodiment. In addition, in the present embodiment, since the backup end time and the remote copy end time are displayed simultaneously, the user is able to view and compare both times via the same screen G10.

Embodiment 3

Figure 14:
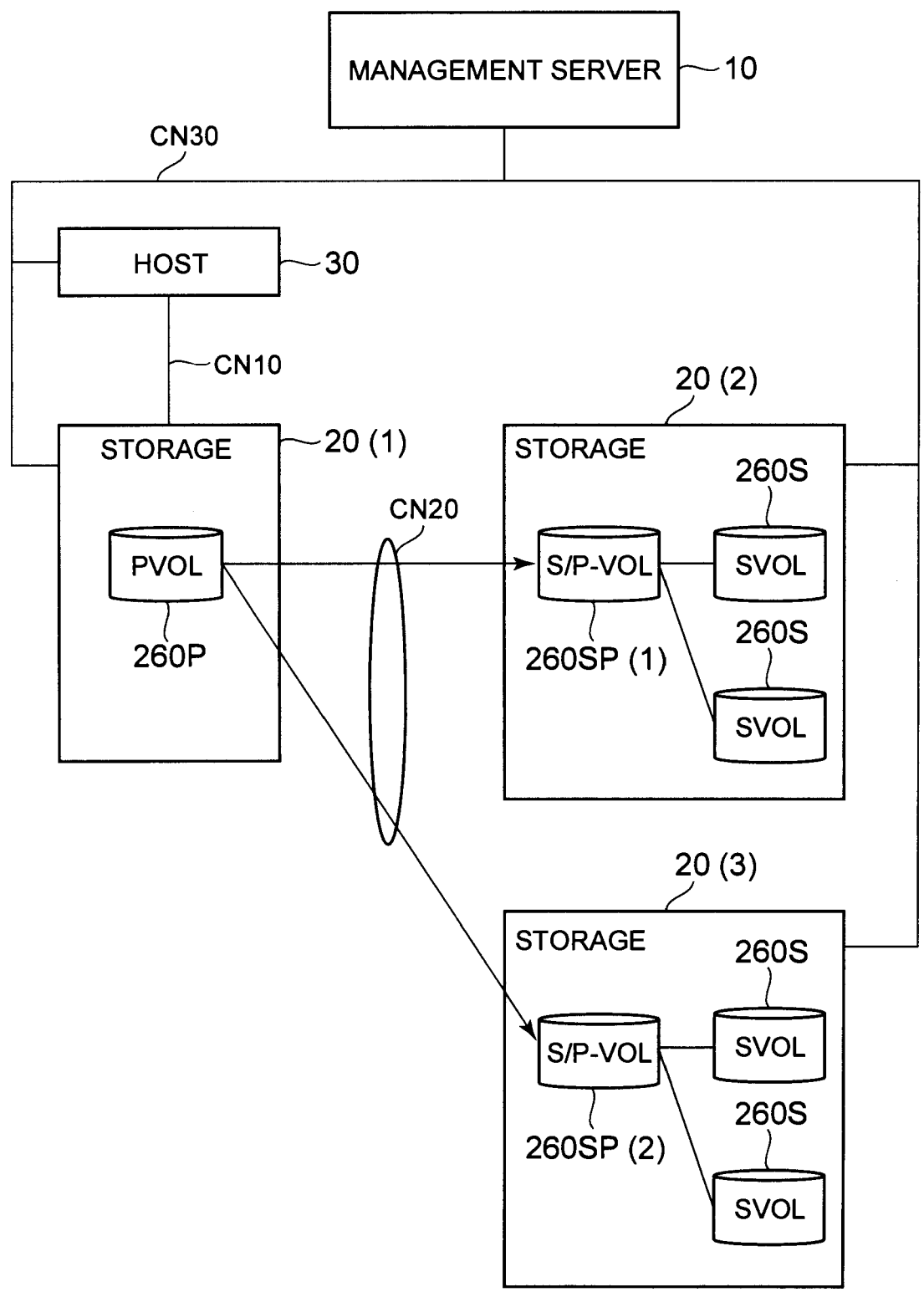
FIG. 14 provides an overview of a system according to a third embodiment.

A third embodiment will now be described based on FIG. 14. FIG. 14 shows the overall configuration of the computer system according to this embodiment. In this system, a plurality of backup target storage apparatuses 20(2) and 20(3) are provided. The backup source volume 260P in the backup source storage apparatus 20(1) is coupled to a first intermediate volume 260SP(1) in a first backup target storage apparatus 20(2) and to a second intermediate volume 260SP(2) in a second backup target storage apparatus 20(3) respectively.

In other words, the backup source volume 260P and first intermediate volume 260SP(1) form a first remote copy pair, and execute a first remote copy. The backup source volume 260P and the second intermediate volume 260SP(2) form a second remote copy pair and execute a second remote copy.

For example, the first remote copy and the second remote copy can both be synchronous remote copies. Alternatively, the first remote copy may be a synchronous remote copy, while the second remote copy may be an asynchronous remote copy.

In cases where the stored content of the backup source volume 260P is restored, the backup end times of each of the backup target volumes 260S are displayed on the screen G10 as per the first embodiment. When the user selects the check box B1, the respective remote copy end times of the intermediate volumes 260SP(1) and 260SP(2) are displayed on the screen G10 instead of the backup end times, or together with the backup end times.

Each remote copy end time of the intermediate volumes 260SP(1) and 260SP(2) may also be displayed simultaneously on the screen G10, or the more recent remote copy end time alone may be displayed on the screen G10.

The present embodiment having the above configuration also exhibits the same effects as the first embodiment. In addition, the present embodiment is also suited to cases where there are a plurality of backup target storage apparatuses, which improves user convenience.

Note that the present invention is not limited to the above embodiments. A person skilled in the art may perform various additions or changes within the scope of the present invention, such as suitably combining the above embodiments, for example.

What is claimed is:

1. A data backup management system, which is coupled to a backup source storage apparatus and a backup target storage apparatus, and manages a data backup from the backup source storage apparatus to the backup target storage apparatus, wherein the backup source storage apparatus includes a backup source volume to be accessed by a host computer, the backup target storage apparatus includes at least one or more backup target volumes, and an intermediate volume which is located between the backup source volume and the at least one or more backup target volumes, and which serves as a backup target for the backup source volume and as a backup source for the at least one or more backup target volumes, the data backup management system comprises:

a communication interface circuit for coupling to the backup source storage apparatus and the backup target storage apparatus via a communication line;

a memory for storing a predetermined computer program and a management table; and a microprocessor which executes the predetermined computer program by reading the program from the memory, and the microprocessor:

controls a remote copy from the backup source volume to the intermediate volume, and a local copy from the intermediate volume to the at least one or more backup target volumes;

creates, in a case where a fault relating to the remote copy or to the local copy is detected, a management screen displaying the at least one or more backup target volumes as a candidate for a restore source volume; and edits, in a predetermined case, part of information on the at least one or more backup target volumes displayed on the management screen on the basis of information relating to the intermediate volume.

2. A data backup management system according to claim 1, wherein the microprocessor compares a remote copy end time relating to the intermediate volume with a local copy end time relating to the at least one or more backup target volumes, and in a case where the remote copy end time is more recent than the local copy end time, rewrites the local copy end time of the at least one or more backup target volumes displayed on the management screen with the remote copy end time, and displays this remote copy end time.

3. A data backup management system according to claim 1, wherein, in a case where the local copy fails, the microprocessor displays a remote copy end time relating to the intermediate volume on the management screen as a local copy end time relating to the at least one or more backup target volumes.

4. A data backup management system according to claim 1, wherein, in a case where a plurality of the at least one or more backup target volumes are displayed on the management screen, the microprocessor:
(1) in a case where a fault occurs in the backup source volume, compares a remote copy end time, relating to the intermediate volume, with a latest local copy end time among local copy end times relating to each of the at least one or more backup target volumes, and in a case where the remote copy end time is more recent than the latest local copy end time, rewrites the latest local copy end time, displayed on the management screen, with the remote copy end time, and displays this remote copy end time, and (2) in a case where the local copy fails, displays the remote copy end time on the management screen as the local copy end time of a backup target volume for which the local copy has failed.

5. A data backup management system according to claim 4, wherein the management screen includes, for each of the at least one or more backup target volumes, a local copy start time, a local copy end time, and information indicating a state of the local copy.

6. A data backup management system according to claim 5, wherein the management screen includes an indication device for indicating whether a search range for the restore source volume is to be a first range or a second range, and the microprocessor, when the first range is indicated, displays on the management screen only each local copy end time of each of the at least one or more backup target volumes, and when the second range is indicated,
(1) in a case where a fault occurs in the backup source volume, and the remote copy end time is more recent than the latest local copy end time, and
(2) in a case where the local copy fails,
the microprocessor displays the remote copy end time on the management screen as the latest local copy end time or the local copy end time.

7. A data backup management system according to claim 6, wherein a remote copy management table for managing the remote copy and a local copy management table for managing the local copy are stored in the memory, the remote copy management table includes a remote copy start time, a remote copy end time, and a state of the remote copy, and the local copy management table includes identification information identifying each of the at least one or more backup target volumes, each local copy start time, each local copy end time, and each state of the local copy, and the microprocessor, when the first range is indicated, displays each of the local copy end times on the management screen by using the local copy management table, and when the second range is indicated, displays the remote copy end time on the management screen as the latest local copy end time or the local copy end time, by using the remote copy management table and the local copy management table.

8. A data backup management system according to claim 1, wherein the microprocessor compares a remote copy end time relating to the intermediate volume with a local copy end time relating to the at least one or more backup target volumes and, when the remote copy end time is more recent than the local copy end time, displays the remote copy end time together with the local copy end time of the at least one or more backup target volumes displayed on the management screen.

9. A computer system including a host computer, a backup source storage apparatus used by the host computer, a backup target storage apparatus coupled to the backup source storage apparatus, and a management apparatus for managing a data backup from the backup source storage apparatus to the backup target storage apparatus, wherein the backup source storage apparatus includes a backup source volume to be accessed by a host computer, the backup target storage apparatus includes at least one or more backup target volumes, and an intermediate volume which is located between the backup source volume and the at least one or more backup target volumes and serves as a backup target for the backup source volume and as a backup source for the at least one or more backup target volumes, and the management apparatus:

controls a remote copy from the backup source volume to the intermediate volume, and a local copy from the intermediate volume to the at least one or more backup target volumes, and creates, in a case where a fault relating to the remote copy or to the local copy is detected, a management screen displaying the at least one or more backup target volume volumes as a candidate for a restore source volume, and edits, in a predetermined case, part of information on the at least one or more backup target volumes displayed on the management screen on the basis of information relating to the intermediate volume.

10. A computer system according to claim 9, wherein in a case where a plurality of the at least one or more backup target volumes are displayed on the management screen, the management apparatus:
(1) in a case where a fault occurs in the backup source volume, compares a remote copy end time, relating to the intermediate volume, with a latest local copy end time among local copy end times relating to each of the at least one or more backup target volumes, and in a case where the remote copy end time is more recent than the latest local copy end time, rewrites the latest local copy end time, displayed on the management screen, with the remote copy end time, and displays the remote copy end time, and (2) in a case where the local copy fails, displays the remote copy end time on the management screen as the local copy end time of a backup target volume for which the local copy has failed.

11. A computer-readable recording medium recorded with a program causing a computer, which is coupled to a backup source storage apparatus and a backup target storage apparatus and manages a data backup from the backup source storage apparatus to the backup target storage apparatus, to implement:

a function for controlling a remote copy from a backup source volume of the backup source storage apparatus to an intermediate volume of the backup target storage apparatus;

a function for controlling a local copy from the intermediate volume to a backup target volume of the backup target storage apparatus;

a function for creating a management screen displaying the backup target volume as a candidate for a restore source volume in a case where a fault relating to the remote copy or to the local copy is detected, and a function for editing, in a predetermined case, part of information on the backup target volume displayed on the management screen on the basis of information relating to the intermediate volume.

\* \* \* \* \*